United States Patent
Mori et al.

[11] Patent Number: 6,007,259
[45] Date of Patent: Dec. 28, 1999

[54] TRIPODS FOR SUPPORTING A VIDEO CAMERA

[75] Inventors: Akinari Mori; Koichiro Nakatani, both of Tokyo; Renjiro Okano, Chiba, all of Japan

[73] Assignee: Sony Corporation, Tokyo, Japan

[21] Appl. No.: 07/873,113

[22] Filed: Apr. 24, 1992

[30] Foreign Application Priority Data

May 15, 1991 [JP] Japan ................................... 3-110410

[51] Int. Cl.$^6$ .......................... F16M 11/38; G03B 17/00
[52] U.S. Cl. ......................... 396/428; 248/168; 348/376
[58] Field of Search .............................. 354/81, 82, 293; 224/265; 248/166, 168, 188.5, 187, 333, 335, 163.1; 403/109; 358/229; 396/419, 420, 421, 422, 428; 348/373, 375, 376

[56] References Cited

U.S. PATENT DOCUMENTS

| | | | |
|---|---|---|---|
| 2,668,682 | 2/1954 | Dalton | 354/293 X |
| 3,836,986 | 9/1974 | Kawazoe | 354/293 |
| 4,134,703 | 1/1979 | Hinners | 248/188.5 X |
| 4,288,102 | 9/1981 | Ramer | 280/823 |
| 4,437,753 | 3/1984 | Dunn | 354/293 |
| 4,545,660 | 10/1985 | Rudolf | 354/82 |
| 4,640,481 | 2/1987 | Kohno | 354/293 X |
| 4,648,697 | 3/1987 | Kawazoe | 354/293 |
| 4,648,698 | 3/1987 | Iwasaki | 354/293 |
| 4,767,090 | 8/1988 | Hartman et al. | 354/81 X |
| 5,043,750 | 8/1991 | Yamaguchi | 354/81 |
| 5,065,249 | 11/1991 | Horn et al. | 358/229 |

Primary Examiner—Eddie C. Lee
Assistant Examiner—J. K. Han
Attorney, Agent, or Firm—Ronald P. Kananen

[57] ABSTRACT

A monopod body is constructed such that inside pipes having smaller diameters sequentially are extensibly inserted into an outside pipe in a telescopic fashion and a bracket to which a panhead is attached is fitted into the upper end of the outside pipe. Two auxiliary legs whose lengths are substantially equal to the shortest length of the monopod body when the monopod body is contracted most are pivotally attached to the bracket so that the two auxiliary legs can be rotated with an inclination of a predetermined angle. Therefore, the monopod for supporting a camera or the like can be served also as a tripod.

15 Claims, 6 Drawing Sheets

TRIPODS FOR SUPPORTING A VIDEO CAMERA

BACKGROUND OF THE INVENTION

1. Field of the Invention

The present invention relates generally to apparatus for supporting a camera or the like and, more particularly, is directed to a monopod which can support a still camera, a video camera, a telescope or the like at a desired height.

2. Description of the Related Art

A conventional supporting monopod is extensible in a telescopic fashion. When this type of monopod is used to support a variety of cameras, a telescope or the like, the monopod is extended to adjust the height of the camera so that a height of a viewfinder or the like coincides with the height of the user's eyes, and supports the camera or the like in a one-point supporting fashion. When the monopod is not in use, the monopod can be contracted and become compact.

According to the monopod thus arranged to support the camera or the like, the camera or the like is supported in a one-point supporting fashion so that the direction of the camera can be smoothly changed when a cameraman takes a picture. On the other hand, if the cameraman gets his hands off the camera or the like after the shooting is finished, then the monopod is fallen. For this reason, the monopod must be usually leaned against other object or the camera must be detached from the monopod each time the shooting is finished.

However, when the monopod is leaned against other object, there is then the risk that the monopod is fallen to damage the camera. Further, in the latter case, it is cumbersome for the cameraman to remove the camera from the monopod. Also, the cameraman cannot take a picture immediately when he wishes. In addition, the monopod cannot be placed independently unlike a tripod and hence a picture cannot be taken automatically.

OBJECTS AND SUMMARY OF THE INVENTION

Therefore, it is an object of the present invention to provide an apparatus for supporting a video camera in which the aforesaid shortcomings and disadvantages of the prior art can be eliminated.

It is another object of the present invention to provide an apparatus for supporting a video camera in which a monopod is given an auxiliary tripod function.

As an aspect of the present invention, the supporting apparatus can be served as a monopod for supporting a camera or the like by extending a monopod body. Also, the supporting apparatus of the present invention can be utilized as a baby tripod such as a grip tripod by opening auxiliary legs with an inclination of a predetermined angle with respect to the monopod body under the condition that the monopod body is contracted to have the shortest length.

When the shooting or the like is interrupted during the supporting apparatus of the present invention is utilized as the monopod for a camera or the like, the monopod body can be temporarily held by opening the auxiliary legs with respect to the monopod body as mentioned before.

BRIEF DESCRIPTION OF THE DRAWINGS

A better understanding of other objects, features, and advantages of the present invention can be gained from a consideration of the following detailed description of an illustrative embodiment thereof, in conjunction with the figures of the accompanying drawings, in which.

DETAILED DESCRIPTION OF THE PREFERRED EMBODIMENT

Figure 1:
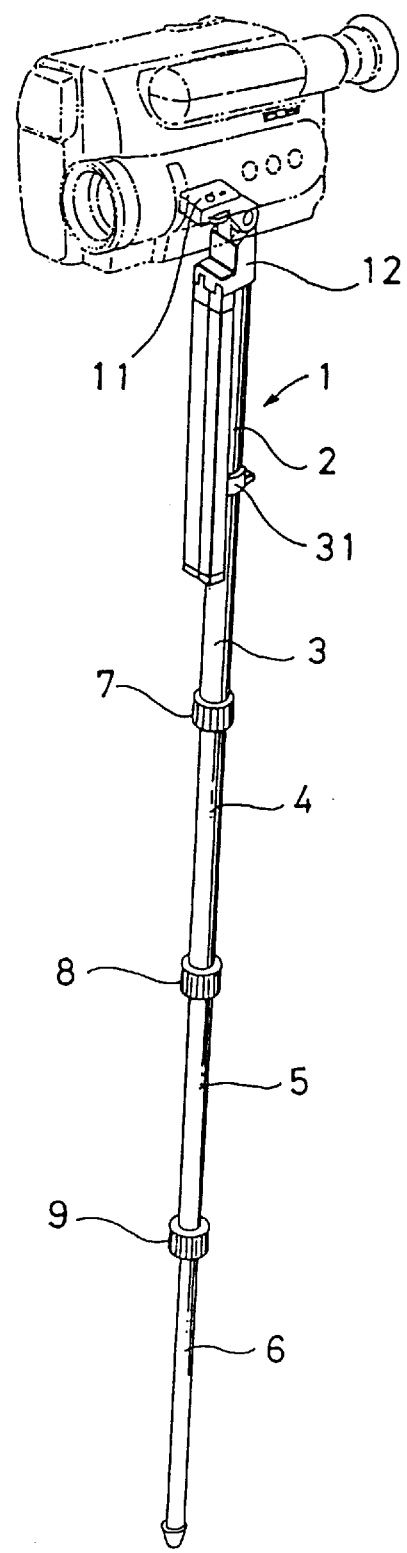
FIG. 1 is a perspective view of an embodiment of a supporting apparatus according to the present invention and illustrating the condition such that the supporting apparatus of the present invention is utilized as a monopod.

The present invention will now be described with reference to the drawings.

As illustrated, a monopod body 1 comprises an outside pipe 2 and a plurality of inside pipes having smaller diameters sequentially, i.e., four inside pipes 3, 4, 5, and 6 in the illustrated embodiment loosely fitted into the outside pipe 2 in a telescopic fashion. Fixed fastening members 7, 8 and 9 are respectively provided between the inside pipes 3 and 4, between the inside pipes 4 and 5 and between the inside pipes 5 and 6. A pushing member 10 is fitted into the upper end portion of the inside pipe 3 and the pushing member 10 is urged against the inner circumferential surface of the outside pipe 2 by turning the inside pipe 3.

Figure 4:
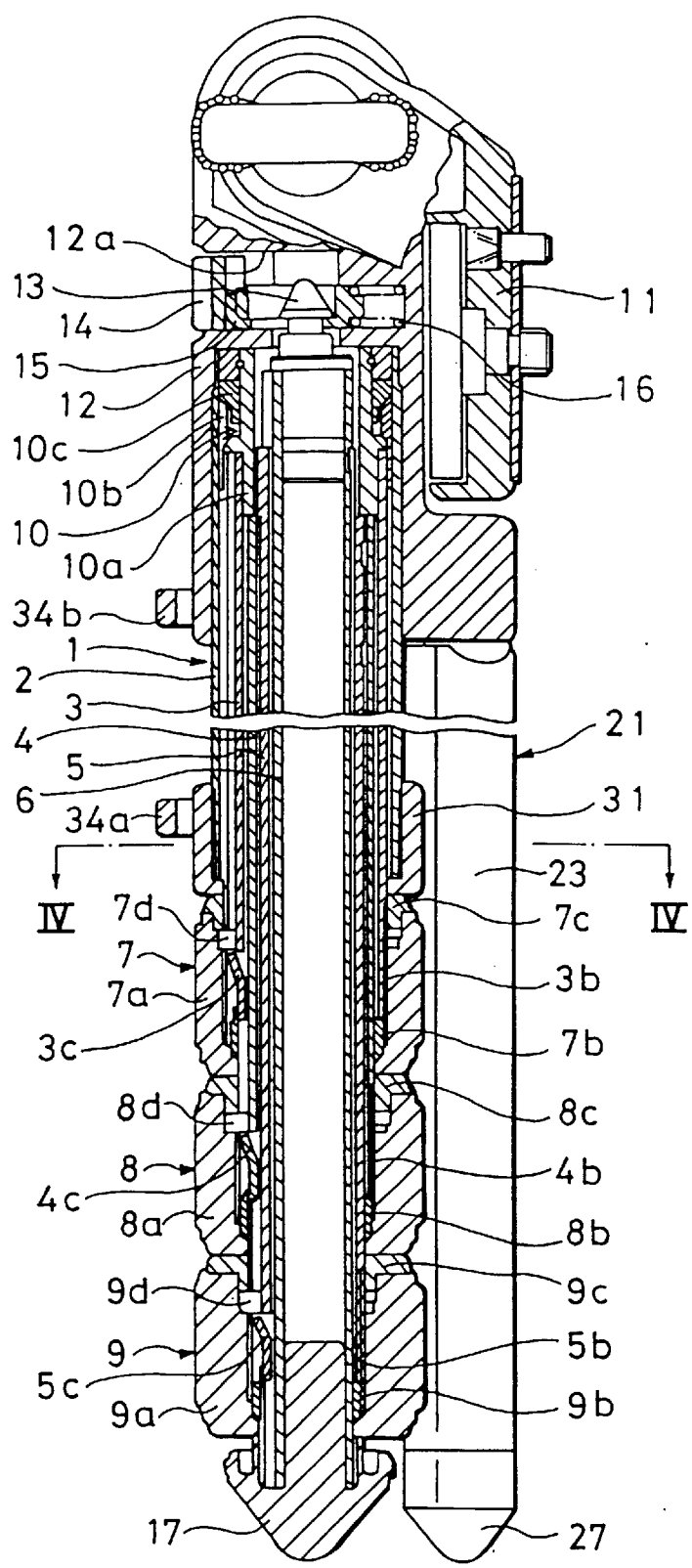
FIG. 4 is a fragmentary cross-sectional view illustrating the folded state of the supporting apparatus of the present invention in an enlarged scale.

A bracket 12 having a panhead 11 is fitted into the upper end of the outside pipe 2. The bracket 12 has a cavity portion 12a to which there is opposed an engagement protrusion 13 fitted into the upper end of the inside center pipe (hereinafter simply referred to as a center pipe) 6 of smallest diameter of the aforementioned inside pipes 3 through 6, as shown in FIG. 4.

The cavity portion 12a is opened to one side surface into which a push button 14 is loosely fitted such that the push button 14 may be slid in the direction perpendicular to the axial direction of the center pipe 6. The push button 14 has fixed thereto an engagement member 15 which is engaged with the engagement protrusion 13 and spring-biased by a compression coil spring 16 so as to engage the engagement member 15 with the engagement protrusion 13. A shoe 17 is fitted into the lower end of the center pipe 6.

Figure 5:
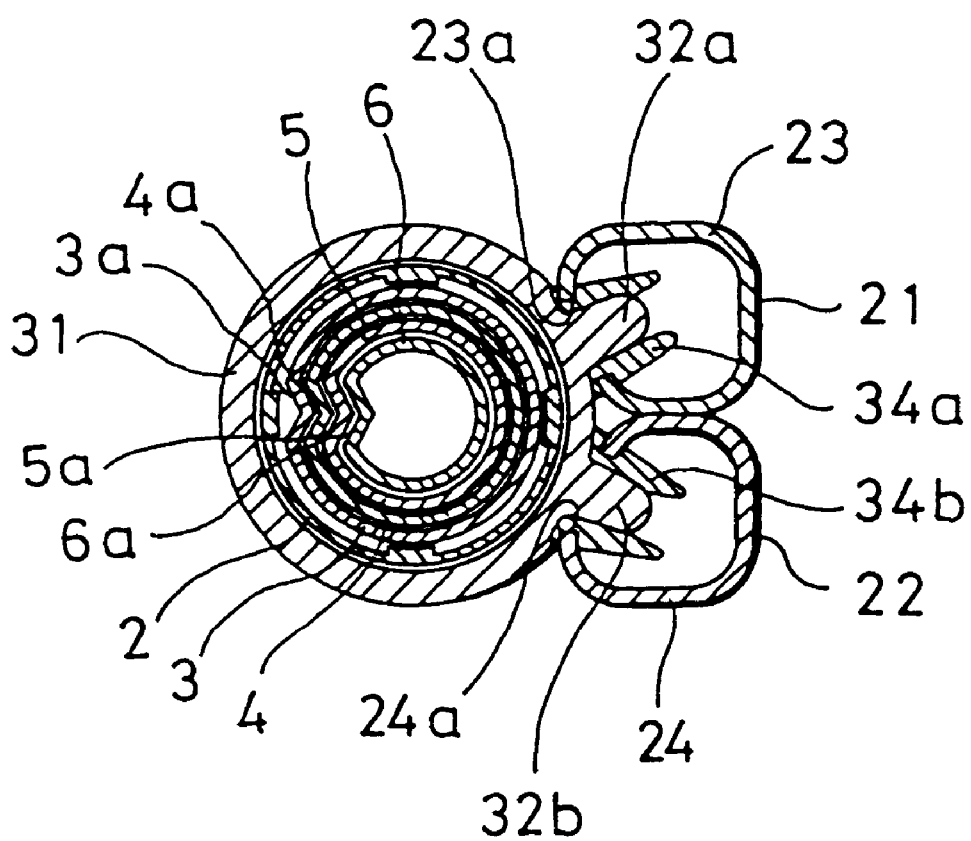
FIG. 5 is a cross-sectional view taken along the line IV—IV in FIG. 4.

Concave portions 3a, 4a, 5a, 6a of substantially V-letter configuration in cross section are respectively formed on the inside pipes 3, 4, 5, 6 at one side surfaces thereof in the longitudinal direction thereof and engaged with one another in the circumferential direction for thereby acting as reinforcing ribs of the respective inside pipes, as shown in FIG. 5.

The fixed fastening members 7, 8, 9 are respectively composed of operation fastening rings 7a, 8a, 9a, tapered press rings 7b, 8b, 9b, lid rings 7c, 8c, 9c and guide rollers 7d, 8d, 9d.

The operation fastening rings 7a, 8a and 9a are respectively loosely fitted into the inside pipes 4, 5, 6 so as to be meshed with screw portions 3b, 4b, 5b formed on the lower end portions of the preceding inside pipes 3, 4, 5 at the larger diameter sides. The press rings 7b, 8b and 9b are slidably inserted into the inside pipes 4, 5, 6 and respectively interposed with pressure between the inside pipes 4, 5, 6 and the operation fastening rings 7a, 8a and 9a by turning the rings 7a, 8a, 9a, thereby the inside pipes 4, 5, 6 being secured to the inside pipes 3, 4, 5 at the preceding stage.

The guide rollers 7d, 8d, 9d for facilitating the smooth rotation of the operation fastening rings 7a, 8a, 9a are interposed between the same and the concave portions 3a, 4a, 5a of the inside pipes 3, 4, 5 at the former stages, received by levers 3c, 4c, 5c formed on the lower portions of the respective concave portions 3a, 4a, 5a and pushed by the lid rings 7c, 8c, 9c fitted to the upper opening portions of the operation fastening rings 7a, 8a, 9a. Also, the inside hollow portions of the operation fastening rings 7a, 8a, 9a are tightly closed by the lid rings 7c, 8c, 9c, respectively.

The urging member 10 fitted to the upper end of the inside pipe 3 comprises a supporting cylindrical member 10a in which a flange portion is formed on the central portion, a screw portion 10a1 is formed on the upper half portion and the lower half portion is fitted to the upper end opening portion of the inside pipe 3, a press ring 10b slidably fitted into the supporting cylindrical member 10a so as to be urged against the inner surface of the outside pipe 2 and a press ring 10c of a tapered configuration screwed to the screw portion of the supporting cylindrical member 10a so as to sandwich with pressure the press ring 10b between it and the flange portion of the supporting cylindrical member 10a from the upper and lower sides. Then, by turning the inside pipe 3, the press ring 10c is moved vertically along the screw portion 10a1. Since the press ring 10c is moved downwardly by turning the inside pipe 3, the press ring 10b is sandwiched with large pressure between the press ring 10c and the flange portion of the supporting cylindrical member 10a and inflated toward the outside, thereby being urged against the inner surface of the outside pipe 2. As a consequence, the inside pipe 3 is secured to the outside pipe 2. Further, when the press ring 10c is moved upwardly by turning the inside pipe 3 in the opposite direction, the press ring 10b is released from being sandwiched with pressure and then returned to the original condition, whereby the press ring 10c becomes slidable relative to the outside pipe 2. Thus, the inside pipe 3 can-be inserted into and extended from the outside pipe 2 in a telescopic fashion. In this operation, the inside pipe 3 can be turned by turning other arbitrary inside pipe because the respective inside pipes 3 to 6 are engaged with one another in the circumferential direction by the concave portions 3a to 6a of substantially V-letter configuration.

The length of the monopod body 1 can be set to a desired length by adjusting the inserted or extended lengths of the inside pipes 3, 4, 5, 6 into or from the outside pipe 2 sequentially and arbitrarily.

That is, in this monopod body 1, under the condition that all inside pipes 3, 4, 5, 6 are fully inserted into the outside pipe 2, the engaging protrusion 13 formed on the upper end of the center pipe 6 of the smallest diameter is engaged with the engaging member 15 provided within the bracket 12, whereby the other inside pipes 3, 4, 5 being engaged and held within the outside pipe 2.

Pushing the push button 14 against the spring-biasing force of the compression coil spring 16 under this condition, the engaging member 15 is disengaged from the engaging protrusion 13 of the center pipe 6 to release the center pipe 6 from being locked, thereby the inside pipes 3 to 6 being projected from the outside pipe 2 due to their own weights.

In this case, under the condition that the fixed fastening members 7, 8, 9 between the inside pipes 3 and 4, 4 and 5, and 5 and 6 are all fastened, the inside pipes 3, 4, 5, 6 are unitarily projected from the outside pipe 2. On the other hand, under the condition that the fixed fastening members 7, 8, 9 are all loosened, the respective inside pipes 3, 4, 5, 6 are sequentially projected relative to the inside pipes of the preceding stages so that all inside pipes 3 through 6 are extended in a so-called one-touch fashion.

When the inside pipe 3 is turned under this condition, the inside pipe 3 is secured to the outside pipe 2 by the pressing member 10 as described before. Then, the inside pipes 3 to 6 are fixed to one another by fastening the respective fixed fastening members 7 to 9 sequentially, thereby forming a monopod.

Incidentally, under the condition such that the inside pipes 3 to 6 are unitarily projected because the respective fixed fastening members 7 to 9 are fastened, the inside pipe 3 is first fastened to the outside pipe 2 and the inside pipes 4 to 6 are projected by loosening the fixed fastening members 7 to 9, respectively. Thereafter, by fastening the fixed fastening members 7 to 9, the inside pipes 3 to 6 are fixed to one another, thereby forming the monopod.

During the monopod is formed, the inside pipes 3 to 6 are respectively fastened and fixed at their intermediate portions of the respective pipe lengths thereof so that a monopod of a desired length can be formed.

The inside pipes 3 to 6 are housed in the outside pipe 2 in a telescopic fashion as follows:

When the outside pipe 2 is lowered under the condition that the respective fixed fastening members 7 to 9 are loosened, the respective inside pipes 3 to 6 are sequentially inserted into the outside pipe 2 and the engagement protrusion 13 of the center pipe 6 is engaged with the engagement member 15 provided within the bracket 12, whereby the inside pipes 3 to 6 are all housed and held within th outside pipe 2. Therefore, the monopod body 1 can be contracted to provide the shortest length.

Figure 2:
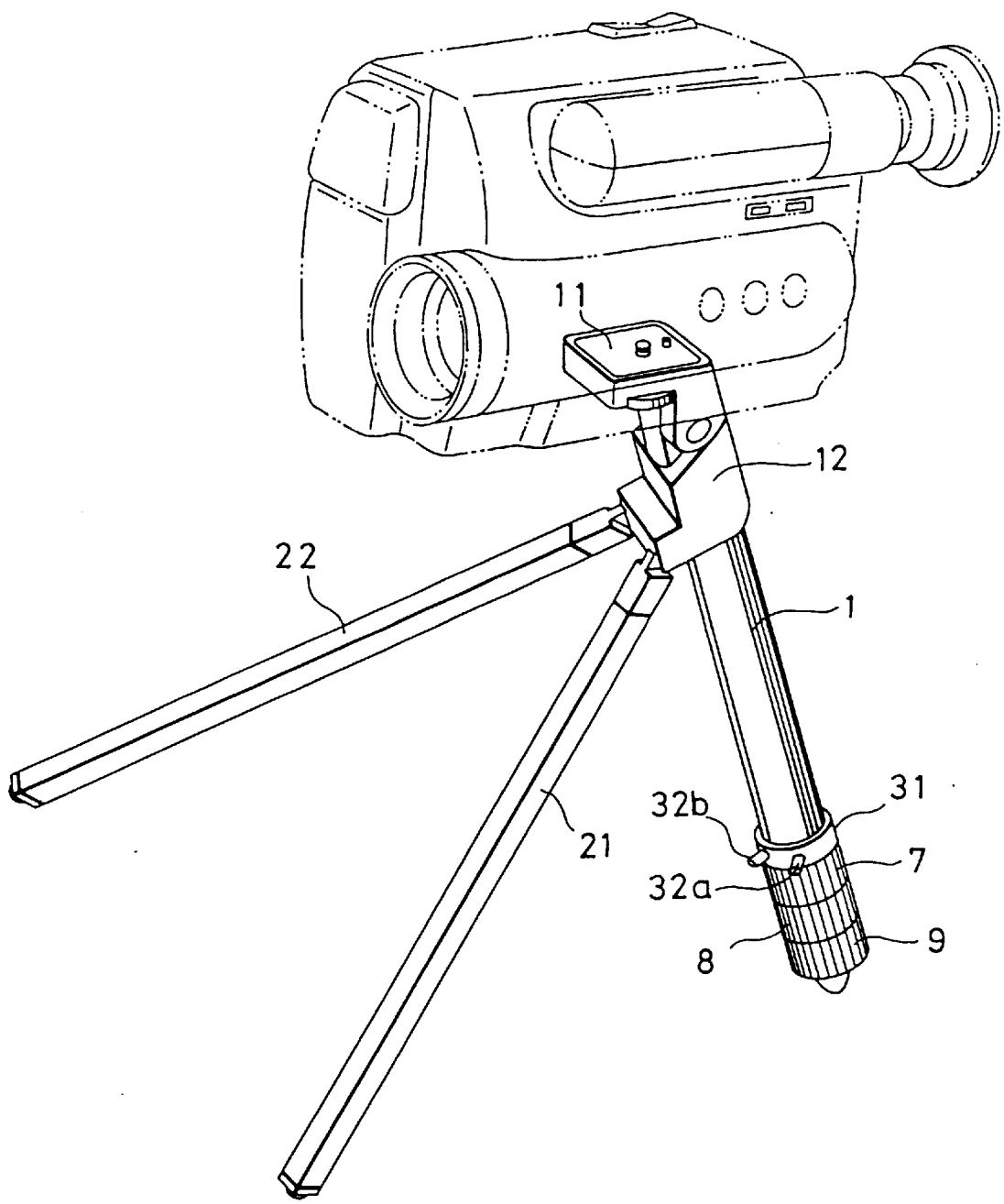
FIG. 2 is a perspective view of the supporting apparatus of the present invention and illustrating the condition such that the supporting apparatus is utilized as a tripod.

According to this embodiment, two auxiliary legs 21, 22 are attached to the monopod thus constructed as, for example, shown in FIG. 2. The auxiliary legs 21, 22 are pivotally attached to the bracket 12 so that the lengths thereof become substantially equal to the contracted shortest length of the monopod body 1 in which the respective inside pipes 3 to 6 are housed in the outside pipe 2.

Figure 6:
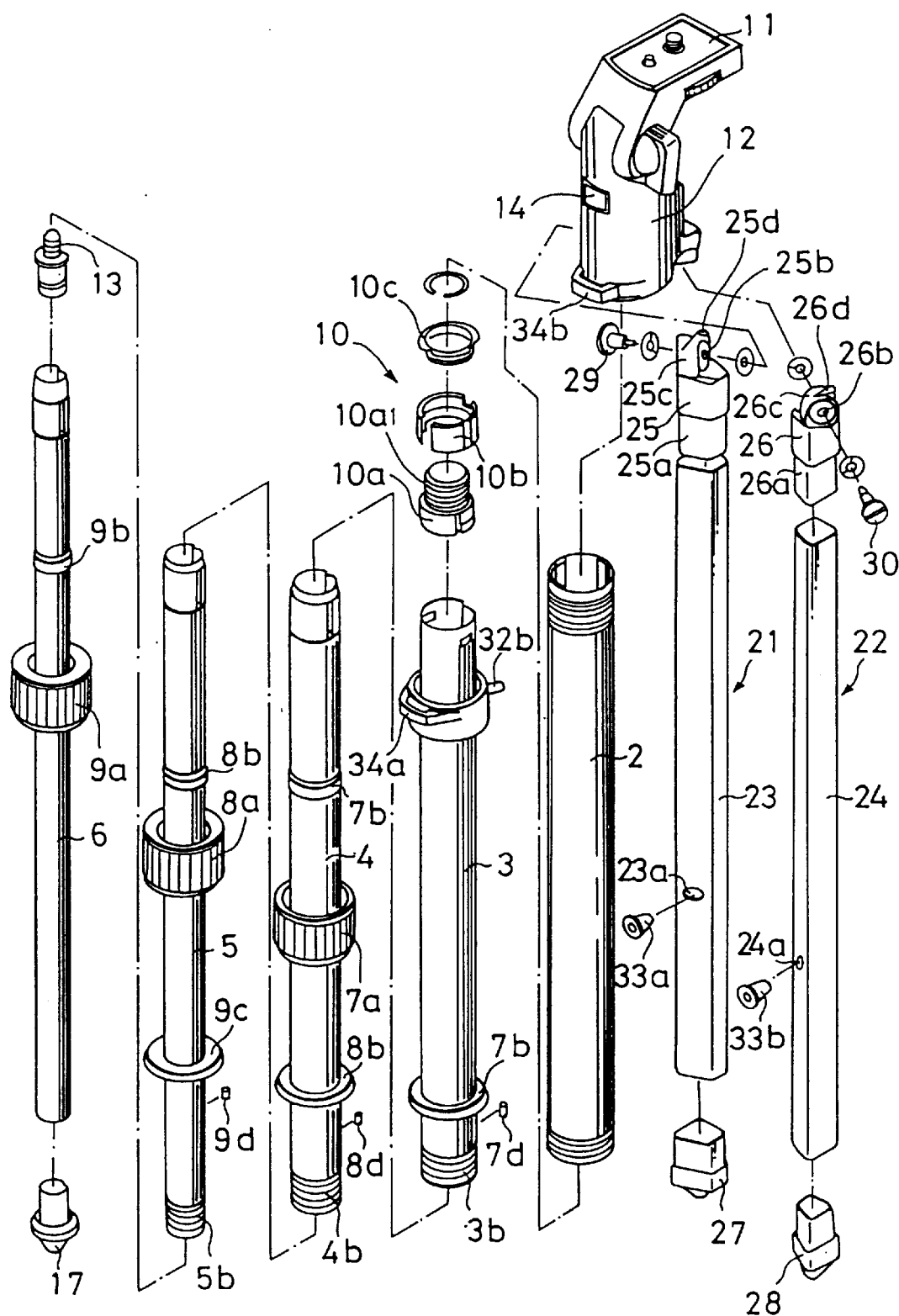
FIG. 6 is an exploded perspective view of the supporting apparatus according to the present invention.

More specifically, as, for example, shown in FIG. 6, the auxiliary legs 21, 22 respectively comprise pipes 23, 24 of deformed quadrilateral configuration in transversal cross section, pivots 25, 26 fitted into the upper ends of the pipes 23, 24 and shoes 27, 28 fitted into the lower ends of the pipes 23, 24. The pivots 25, 26 of the auxiliary legs 21, 22 respectively comprises engagement portions 25a, 26a formed on the lower half portions thereof, the engagement portions 25a, 26a being respectively fitted into the upper opening ends of the pipes 23, 24, pivot portions 25c, 26c respectively having shaft apertures 25b, 26b and projected on the upper portions of the upper half portions thereof and engagement stepped portions 25d, 26d formed on the upper surfaces of the pivot portions 25c, 26c.

Figure 3:
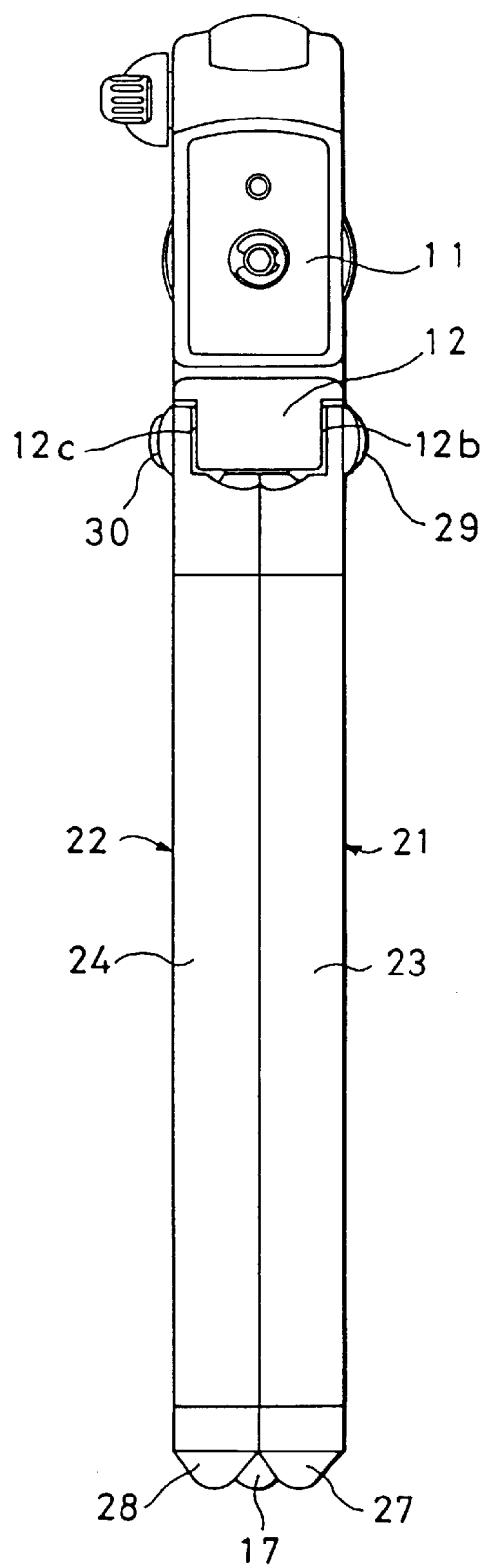
FIG. 3 is a front view illustrating the condition such that the supporting apparatus of the present invention is in a folded state.

The auxiliary legs 21, 22 thus constructed are pivotally attached to bearing portions 12b, 12c formed on the bracket 12 fitted into the upper end of the monopod body 1 in response to the tilt direction of the panhead 11 by means of stepped screw shafts 29, 30 at the pivots 25, 26 formed on the upper ends of the pipes 23, 24, as shown in FIG. 3.

The bearing portions 12b, 12c of the bracket 12 are formed with an inclination of a predetermined angle so that the auxiliary legs 21, 22 may be kept open along two edge lines of a triangle cone with respect to the monopod body 1 and include engagement portions engaged with the engagement stepped portions 25d, 26d of the pivots 25, 26.

The two auxiliary legs 21, 22 are accommodated within the width of the panhead 11 under the condition that they are closed, i.e., under the condition that they are folded in the same direction as that of the monopod body 1 and contacted as shown in FIGS. 3 and 4. Protrusions 32a, 32b are projected on an outside ring 31 secured to the outside pipe 2 of the monopod body 1 at their surfaces opposing the two auxiliary legs 21, 22. Engagement apertures 23a, 24a are respectively bored through the pipes 23, 24 of the two auxiliary legs 21, 22 in association with the protrusions 32a, 32b (see FIG. 6). Rubber bushings 33a, 33b are fitted into the engagement apertures 23a, 24a. When in the folded state, the two auxiliary legs 21, 22 are held in a fixed state relative to the monopod body 1 by engaging the engagement apertures 23a, 24a into the protrusions 32a, 32b through the rubber bushings 33a, 33b, respectively.

Belt tying portions 34b, 34a are projected on the bracket 12 and the outside ring 31 in an opposing relation, as shown in FIG. 4.

As described above, the two auxiliary legs 21, 22 are attached to the monopod body 1 so that, when the auxiliary legs 21, 22 are opened under the condition that the monopod body 1 is contracted to have the shortest length, the supporting apparatus of the present invention is served as a baby tripod, which can make it possible to place the supporting apparatus of the present invention with a video camera or the like on the flat surfaces such as a table or the like to take a picture and so on.

Under the condition that the two auxiliary legs 21, 22 are folded, they are accommodated within the width of the panhead 11 put on the bracket 12 and kept in a fixed condition to the monopod body 1. Accordingly, the two auxiliary legs 21, 22 are unitarily kept as a compact rod, which can make the supporting apparatus of the present invention easy to be accommodated and to carry when not in use.

The monopod body 1, the configurations of the two auxiliary legs 21, 22, the configuration of the bracket 12 or the like can be modified variously in response to the design of the entirety of the supporting apparatus.

Incidentally, the panhead 11 can be constructed in a well-known manner and therefore need not be described in detail.

As described above, according to the supporting apparatus of the present invention, only the monopod body can be served as the monopod which supports a camera and so on similarly to the ordinary monopod. Also, when the two auxiliary legs are opened with the inclination of the predetermined angle under the condition that the monopod body is contracted to have the shortest length, the supporting apparatus of the present invention can be served as the baby tripod which is used on the table or the like. Thus, the supporting apparatus of the present invention has a composite function of monopod and tripod and can therefore be utilized in a wider variety of fields.

Furthermore, when the supporting apparatus of the present invention is utilized as the monopod, the auxiliary legs can be effectively utilized not only as the legs constructing the tripod but also in a variety of operations, such as a support used when the monopod body is held upright, a handle used when the cameraman takes a picture or the like.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. An apparatus for supporting a video camera comprising:
   (a) a monopod body which is extensible in a telescopic fashion from a most contracted condition to an extended condition;
   (b) a bracket fixedly secured to an upper end of said monopod body;
   (c) a panhead pivotally attached to said bracket; and
   (d) two auxiliary legs of a fixed length pivotally attached to said bracket and rotatable from a position generally parallel with said monopod body to an inclined position at a predetermined angle with respect to said monopod body, said fixed length of each of said auxiliary legs being substantially equal to a shortest length of said monopod body when said monopod body is in its most contracted condition, said auxiliary legs being accommodated within a width of said panhead when said auxiliary legs are not inclined with respect to said panhead, whereby when said auxiliary legs are not inclined with respect to said panhead said monopod body may function as a monopod support, and when said auxiliary legs are inclined with respect to said panhead and said monopod body is in its most contracted condition said monopod support may be converted to a tripod support where said auxiliary legs and said monopod body support said video camera as a tripod.

2. An apparatus for supporting a video camera, comprising:
   (a) a monopod body which is extensible in a telescopic fashion from a most contracted condition to an extended condition;
   (b) a bracket fixedly secured to an upper end of said monopod body;
   (c) a panhead pivotally attached to said bracket; and
   (d) two auxiliary legs of a fixed length pivotally attached to said bracket and rotatable from a position generally parallel with said monopod body to an inclined position at a predetermined angle with respect to said monopod body, said fixed length of each of said auxiliary legs being substantially equal to a shortest length of said monopod body when said monopod body is in its most contracted condition, said auxiliary legs being accommodated within a width of said panhead when said auxiliary legs are not inclined with respect to said panhead, whereby when said auxiliary legs are not inclined with respect to said panhead said monopod body may function as a monopod support, and when said auxiliary legs are inclined with respect to said panhead and said monopod body is in its most contracted condition said monopod support may be converted to a tripod support where said auxiliary legs and said monopod body support said video camera as a tripod;
   said monopod body further comprising:
   (1) an outside pipe with said bracket fixedly secured to an upper end thereof;
   (2) a plurality of inside pipes capable of being inserted into said outside pipe in a telescopic fashion; and (3) a press member provided on an inner circumferential surface of an upper end portion of said outside pipe and urged against said inner circumferential surface by turning said inside pipes.

3. The apparatus according to claim 2, wherein a center pipe of said inside pipes has an engaging protrusion formed on an upper end thereof, said bracket has an engaging member formed therein, said engaging protrusion and said engaging member being engageable with each other to lock said monopod body in said most contracted condition, and a push button release means for selectively unlocking said engaging member from said engaging protrusion.

4. The apparatus according to claim 2, wherein said inside pipes have concave portions of V-letter letter configurations extending along a length thereof to limit rotation of said inside pipes with respect to one another.

5. The apparatus according to claim 2, wherein said inside pipes have fixed fastening members formed on end portions thereof, said fixed fastening members being operable to selectively fix and loosen said inside pipes with respect to one another.

6. An apparatus for supporting a video camera comprising:
- a monopod body which is extensible in a telescopic fashion between an unextended condition and an extended condition for supporting said video camera as a monopod support;
- a bracket fixedly secured to an upper end of said monopod body;
- a panhead pivotally attached to said bracket; and
- two auxiliary legs of a fixed length substantially equal to said monopod body in its unextended condition, said auxiliary legs pivotally attached to said bracket and rotatable from a position generally parallel with said monopod body to an inclined position at a predetermined angle with respect to said monopod body to provide, in conjunction with said monopod body, a tripod support for said video camera when said auxiliary legs are rotated to said predetermined angle and said monopod body is in its unextended position.

7. The apparatus according to claim 6, wherein said auxiliary legs are accommodated within a width of said panhead when said auxiliary legs are not inclined with respect to said panhead, whereby said monopod body functions as a monopod support.

8. An apparatus for supporting a video camera, comprising:
- a monopod body which is extensible in a telescopic fashion between an unextended condition and an extended condition for supporting said video camera as a monopod support;
- a bracket fixedly secured to an upper end of said monopod body;
- a panhead pivotally attached to said bracket; and
- two auxiliary legs of a fixed length substantially equal to said monopod body in its unextended condition, said auxiliary legs pivotally attached to said bracket and rotatable from a position generally parallel with said monopod body to an inclined position at a predetermined angle with respect to said monopod body to provide, in conjunction with said monopod body, a tripod support for said video camera when said auxiliary legs are rotated to said predetermined angle and said monopod body is in its unextended position;
said monopod body further comprising:
(1) an outside pipe with said bracket fixedly secured to an upper end thereof;
(2) a plurality of inside pipes capable of being inserted into said outside pipe in a telescopic fashion; and
(3) a press member provided on an inner circumferential surface of an upper end portion of said outside pipe and urged against said inner circumferential surface by turning said inside pipes.

9. The apparatus according to claim 8, wherein said inside pipes have concave portions of V-letter letter configurations extending along a length thereof to limit rotation of said inside pipes with respect to one another.

10. The apparatus according to claim 8, wherein said inside pipes have fixed fastening members formed on end portions thereof, said fixed fastening members being operable to selectively fix and loosen said inside pipes with respect to one another.

11. An apparatus for supporting a video camera comprising:
- a monopod body extensible in a telescopic fashion for supporting said video camera as a monopod support;
- a bracket fixedly secured to an upper end of said monopod body; and
- two auxiliary legs of a fixed length pivotally attached to said bracket, said auxiliary legs being rotatable from a position generally parallel with said monopod body to an inclined position at a predetermined angle with respect to said monopod body to provide, in conjunction with said monopod body, a tripod support for said video camera when said auxiliary legs and said monopod body are of a substantially equal length.

12. The apparatus according to claim 11, wherein said auxiliary legs are accommodated within a width of said panhead when said auxiliary legs are not inclined with respect to said panhead, whereby said monopod body functions as a monopod support.

13. An apparatus for supporting a video camera, comprising:
- a monopod body extensible in a telescopic fashion for supporting said video camera as a monopod support;
- a bracket fixedly secured to an upper end of said monopod body; and
- two auxiliary legs of a fixed length pivotally attached to said bracket, said auxiliary legs being rotatable from a position generally parallel with said monopod body to an inclined position at a predetermined angle with respect to said monopod body to provide, in conjunction with said monopod body, a tripod support for said video camera when said auxiliary legs and said monopod body are of a substantially equal length;
said monopod body further comprising:
(1) an outside pipe with said bracket fixedly secured to an upper end thereof;
(2) a plurality of inside pipes capable of being inserted into said outside pipe in a telescopic fashion; and
(3) a press member provided on an inner circumferential surface of an upper end portion of said outside pipe and urged against said inner circumferential surface by turning said inside pipes.

14. The apparatus according to claim 13, wherein said inside pipes have concave portions of V-letter configurations extending along a length thereof to limit rotation of said inside pipes with respect to one another.

15. The apparatus according to claim 13, wherein said inside pipes have fixed fastening members formed on end portions thereof, said fixed fastening members being operable to selectively fix and loosen said inside pipes with respect to one another.

* * * * *